(12) United States Patent
Jones et al.

(10) Patent No.: US 8,542,992 B2
(45) Date of Patent: Sep. 24, 2013

(54) SYSTEM AND METHOD FOR MITIGATING POLARIZATION HOLE BURNING

(75) Inventors: Kevan P. Jones, Kanata (CA); Denis Daniel Leclair, Kanata (CA); Sean D. L. McVeigh, Dunrobin (CA); Jean V. E. Ouellet, Ottawa (CA); Douglas J. Greenwood, Ottawa (CA); John B. Mills, Ottawa (CA); Robert W. Keys, Stittsville (CA)

(73) Assignee: Fujitsu Limited, Kawasaki-shi (JP)

( * ) Notice: Subject to any disclaimer, the term of this patent is extended or adjusted under 35 U.S.C. 154(b) by 656 days.

(21) Appl. No.: 12/713,792

(22) Filed: Feb. 26, 2010

(65) Prior Publication Data
US 2011/0211835 A1     Sep. 1, 2011

(51) Int. Cl.
H04B 10/155     (2006.01)

(52) U.S. Cl.
USPC ............... 398/30; 398/31; 398/32; 398/33

(58) Field of Classification Search
USPC ............................................. 398/30–33
See application file for complete search history.

(56) References Cited

U.S. PATENT DOCUMENTS

| | | | |
|---|---|---|---|
| 5,107,358 A | 4/1992 | Hodgkinson et al. | 359/124 |
| 5,127,066 A | 6/1992 | Poggiolini | 385/24 |
| 5,327,511 A | 7/1994 | Heismann et al. | 385/1 |
| 5,400,166 A | 3/1995 | Huber | 359/173 |
| 5,491,576 A | 2/1996 | Bergano | 359/156 |
| 6,097,525 A | 8/2000 | Ono et al. | 359/181 |
| 6,377,378 B1 | 4/2002 | Frascolla et al. | 359/156 |
| 7,177,540 B2 * | 2/2007 | Inoue et al. | 398/16 |
| 7,711,266 B1 | 5/2010 | Harris | |
| 2005/0024715 A1 | 2/2005 | Inoue et al. | |
| 2005/0281557 A1 | 12/2005 | Fishman et al. | |
| 2008/0080865 A1 | 4/2008 | Muro et al. | |
| 2009/0116842 A1 | 5/2009 | Stango et al. | |
| 2009/0297143 A1 * | 12/2009 | Takeyama et al. | 398/34 |

FOREIGN PATENT DOCUMENTS

| | | |
|---|---|---|
| DE | 44 33 844 | 9/1994 |
| EP | 0 277 427 | 12/1987 |
| EP | 0 615 356 | 3/1994 |
| EP | 0 660 548 | 12/1994 |
| EP | 0 737 880 | 4/1996 |
| EP | 0 757 276 | 7/1996 |

OTHER PUBLICATIONS

Bolshtyansky et al., "Spectral Hole Burning in EDFA under Various Channel Load Conditions", 2009 OSA/OFC/NFOEC 2009, 3 pages.
Noe et al.; "Depolariser Based on Acousto-Optical TE-TM Converters for Suppression of Polarisation Hole-burning in Long Haul EDFA Links"; Electronic Letters, vol. 30, No. 18; pp. 1500-1501; Sep. 1, 1994.
Heismann; "Compact Electro-Optic Polarization Scramblers for Optically Amplified Lightwave Systems"; Journal of Lightware Technology, vol. 14, No. 8; pp. 1801-1814; Aug. 1996.
M. Rehage et al.; "Wavelength-Selective Polarization Analyser with Integrated Ti :LiNbO3 Acousto-Optical TE-TM Converter"; Electronic Letters, vol. 30, No. 14; pp. 1130-1131; Jul. 7, 1994.
U.S. Appl. No. 12/713,847, filed Feb. 26, 2010; pp. 55.
U.S. Appl. No. 12/713,918, filed Feb. 26, 2010; pp. 56.
U.S. Appl. No. 12/714,004, filed Feb. 26, 2010; pp. 57.
Final Office Action; U.S. Appl. No. 12/713,847; pp. 17, Feb. 8, 2013.
Final Office Action; U.S. Appl. No. 12/713,918; pp. 16, Feb. 20, 2013.

* cited by examiner

*Primary Examiner* — Danny Leung
(74) *Attorney, Agent, or Firm* — Baker Botts L.L.P.

(57) ABSTRACT

A system for mitigating the effects of polarization hole burning in an optical communication system. The system includes an optical input signal comprising one or more traffic channels, a measurement module configured to check for the existence of ghost channels around the traffic channels, and a ghost channel generation module configured to generate a ghost channel around the traffic channels from amplified spontaneous emission noise of the optical input signal.

14 Claims, 8 Drawing Sheets

| CH # | WCS | WCF |
|---|---|---|
| 1 | | |
| 2 | | |
| ⋮ | ⋮ | ⋮ |
| 88 | | |

LOCAL DEGREE WCH

700

| CHANNEL INPUTS FOR DEGREE n | | | |
|---|---|---|---|
| CH # | WCS | WCF | SPLITTER INPUT PWR |
| 1 | | | |
| 2 | | | |
| ⋮ | ⋮ | ⋮ | ⋮ |
| 88 | | | |

INGRESS INFORMATION FOR CHANNEL 1
INGRESS INFORMATION FOR CHANNEL 2
INGRESS INFORMATION FOR CHANNEL 88

| DEGREE | VALID | WCS | WCF | SPLITTER INPUT PWR |
|---|---|---|---|---|
| 1 | | | | |
| 2 | | | | |
| 3 | | | | |
| 4 | | | | |

| GHOST COUNT TABLE | |
|---|---|
| DEGREE | CURRENT GHOST COUNT |
| 1 | |
| 2 | |
| 3 | |
| 4 | |

*FIG. 9*

SYSTEM AND METHOD FOR MITIGATING POLARIZATION HOLE BURNING

TECHNICAL FIELD

This invention relates generally to the field of optical communication networks and more specifically to mitigating the effects of polarization hole burning.

BACKGROUND

A communication network includes paths of nodes that route packets through the network. Optical amplifiers perform an important function within these networks by amplifying an optical signal in order to increase the operational length of an optical network. In some configurations, the efficiency of an optical communication network may be compromised by an effect known as polarization hole burning.

Optical communication systems designed to operate over long distances may suffer from multiple polarization-dependent effects that reduce the operational efficiency of the system. Polarization hole burning (PHB) is one of these phenomena. PHB may seriously reduce the performance of rare-earth doped fiber optical amplifiers, such as an erbium doped fiber amplifier (EDFA), used to amplify signal strength within the communication system.

PHB occurs when a strong, polarized optical signal is launched into an EDFA. This strong signal can cause anisotropic saturation of the amplifier. This saturation effect, which is related to the population inversion dynamics of the EDFA, depresses the gain of the EDFA for light with the same state of polarization (SOP) as the saturating signal. Thus, PHB causes a signal having a SOP orthogonal to the saturating signal to have a gain greater than that of the saturating signal.

As a result, amplified spontaneous emission (ASE) noise in the SOP orthogonal to the saturating signal may accumulate faster than in the SOP of the saturating signal. In a communication system utilizing a chain of EDFAs operating at or near saturation, ASE noise may accumulate at each amplifier stage. As the noise builds up over the course of the system, the signal-to-noise ratio (SNR) for a signal with a SOP orthogonal to the saturating signal may rise to unacceptable levels. The SNR in such cases can then cause errors in the received data stream. Accordingly, mitigating the effects of PHB in amplified optical systems is desirable.

One of the causes of the undesirable PHB effect is operating an EDFA in a way that leads to gain compression. Gain compression ("Cp") is a measure of the difference of the amplifier's non-saturated gain ("Go," or the gain when operating on a low power signal) and the amplifier's saturated operating gain ("G"). The operating gain, in decibels, can be measured by taking the difference between the saturated output power ("So") and the input power of a saturating signal ("Si)", as follows:

$G=So-Si$.

The corresponding gain compression may be calculated as the difference between the non-saturated gain and the saturated operating gain:

$Cp=Go-G$.

The gain in the SOP orthogonal to a saturating signal may be measured using a probe signal with an input signal orthogonal to the saturating signal by measuring the input power ("Pi") and output power ("Po") of the probe signal:

$Po-Pi=G+\Delta G$.

The "$\Delta G$" in the above formula represents the amount of PHB in the SOP orthogonal to the saturation signal. This is a result of operating the amplifier with a saturating signal. As gain compression of an amplifier increases, so does the amount and effect of PHB. For instance, a single EDFA operating at a gain compression of about 3 dB may produce a PHB of about 0.08 dB. However, when that EDFA operates in a more saturated condition, with Cp=9-10 dB, the PHB may rise to about 0.2 dB.

The degree of PHB may also be affected by other factors, such as the degree of polarization of the saturating signal. If a signal's SOP varies over time, the effects of PHB may be reduced.

While the degree of PHB may be small for a single EDFA, these effects may be seriously compounded in communication systems that chain together a series of EDFAs. A number of arrangements have been proposed for reducing the effects of PHB in optical communication systems. However, such arrangements continue to suffer from drawbacks such as an inability to deal with arbitrary channel loading, expense and difficulty of implementation, and the innate stability characteristics of rare-earth doped fiber amplifiers.

SUMMARY OF THE DISCLOSURE

In accordance with the present invention, disadvantages and problems associated with previous techniques for mitigating the effects of polarization hole burning in optical amplifiers may be reduced or eliminated.

According to one embodiment of the present invention, a system is provided for mitigating the effects of polarization hole burning in an optical communication system. The system includes an optical input signal comprising one or more traffic channels, a measurement module configured to check for the existence of ghost channels around the traffic channels, and a ghost channel generation module configured to generate a ghost channel around the traffic channels from amplified spontaneous emission noise of the optical input signal.

Certain embodiments of the invention may provide one or more technical advantages. A technical advantage of one embodiment may be that creating ghost channels around a saturating signal in an optical communication network increases the signal to noise ratios of those signals with adjacent ghost channels. In some embodiments, the creation of one or more ghost channel(s) on one side or both sides of an optical signal may provide a low-cost implementation for polarization hole burning mitigation.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 7 illustrates a table for storing information regarding the validity and signal strength of a channel incoming to a particular degree of node, in accordance with certain embodiments of the present disclosure;

FIG. 8 illustrates a series of tables representing the consolidated information received from other degrees of node, in accordance with certain embodiments of the present disclosure;

FIG. 9 illustrates a table for storing information regarding the current ghost channel load for degrees in node, in accordance with certain embodiments of the present disclosure;

DETAILED DESCRIPTION OF THE DRAWINGS

Embodiments of the present invention and its advantages are best understood by referring to FIGS. 1 through 13 of the drawings, like numerals being used for like and corresponding parts of the various drawings.

Figure 1:
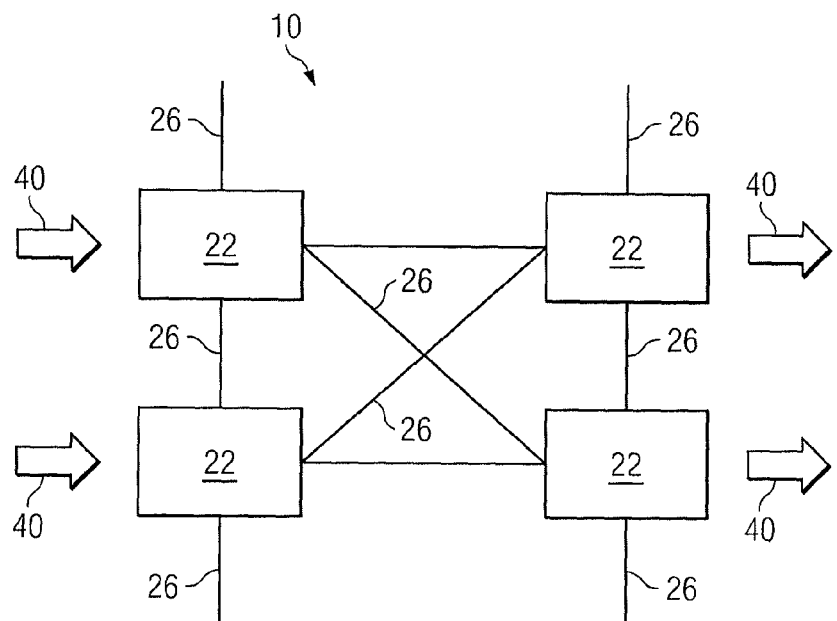
FIG. 1 illustrates an optical communication network system, in accordance with certain embodiments of the present disclosure.

FIG. 1 illustrates an optical communication network system, in accordance with certain embodiments of the present disclosure. Optical network system 10 includes components such as network nodes 22. In general, a network node 22 may include any suitable arrangement of components operable to perform the operations of the network node. As an example, a network node may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a network node operable to receive input for the network node, send output from the network node, perform suitable processing of the input or output or both, or any combination of the preceding, and may comprise one or more ports, conversion software, or both.

"Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Network system 10 communicates information through signals, such as an optical signal. As an example, an optical signal may have a frequency of approximately 1550 nanometers and a data rate of 10, 20, 40, or over 40 gigabits per second.

According to the illustrated embodiment, network system 10 may include one or more networks. A network may include nodes 22 coupled by fibers 26 in a mesh topology as shown in FIG. 1 or any other suitable topology, such as a liner or ring topology.

The components of network system 10, coupled together by the optical fibers 26, may include one or more reconfigurable optical add/drop multiplexers (ROADM), one or more amplifiers, and one or more splitters, as described in more detail below with reference to FIG. 2. Network system 10 may be used in any optical communication network, or any other suitable network or combination of networks. Optical fibers 26 comprise any suitable type of fiber, such as a Single-Mode Fiber (SMF), Enhanced Large Effective Area Fiber (E-LEAF), or TrueWave® Reduced Slope (TW-RS) fiber.

In a given topology, each node 22 will have an associated number of "degrees." The number of degrees of node 22 may be defined to be the number of links incident to node 22. In the illustrated embodiment, a portion of a mesh topology consisting of four nodes 22 is shown. Each node 22 has four degrees: three links to the other nodes 22 of network system 10 and a link to the remaining portion of network system 10. The number of degrees may be any number, depending on the particular topology and implementation chosen.

In some embodiments, network system 10 may be designed to assign each incoming signal to a particular "channel," or carrier wavelength. The number of channels and the wavelengths assigned may vary depending on the chosen implementation. As an illustrative example, network system 10 may carry 88 channels in the 1550 nm wavelength band, with a channel separation of 50 GHz (~0.4 nm). That is, network system 10 may potentially communicate information on carrier wavelengths between 1528.77 nm (196.1 THz) and 1563.45 nm (191.75 THz). In some embodiments, network system 10 may include some means of dynamically allocating incoming signals to various wavelengths, depending on the design needs, such that none, some, or all channels are in use at one time.

The process of communicating information over multiple channels of a single optical path is referred to in optics as wavelength division multiplexing (WDM). Dense wavelength division multiplexing (DWDM) refers to the multiplexing of a larger (denser) number of wavelengths, usually greater than forty, onto a fiber. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information. Referring back to FIG. 1, network system 10 is operable to transmit disparate channels using WDM, DWDM, or some other suitable multi-channel channel multiplexing technique, and to amplify the multiplexed wavelengths 40.

Figure 2:
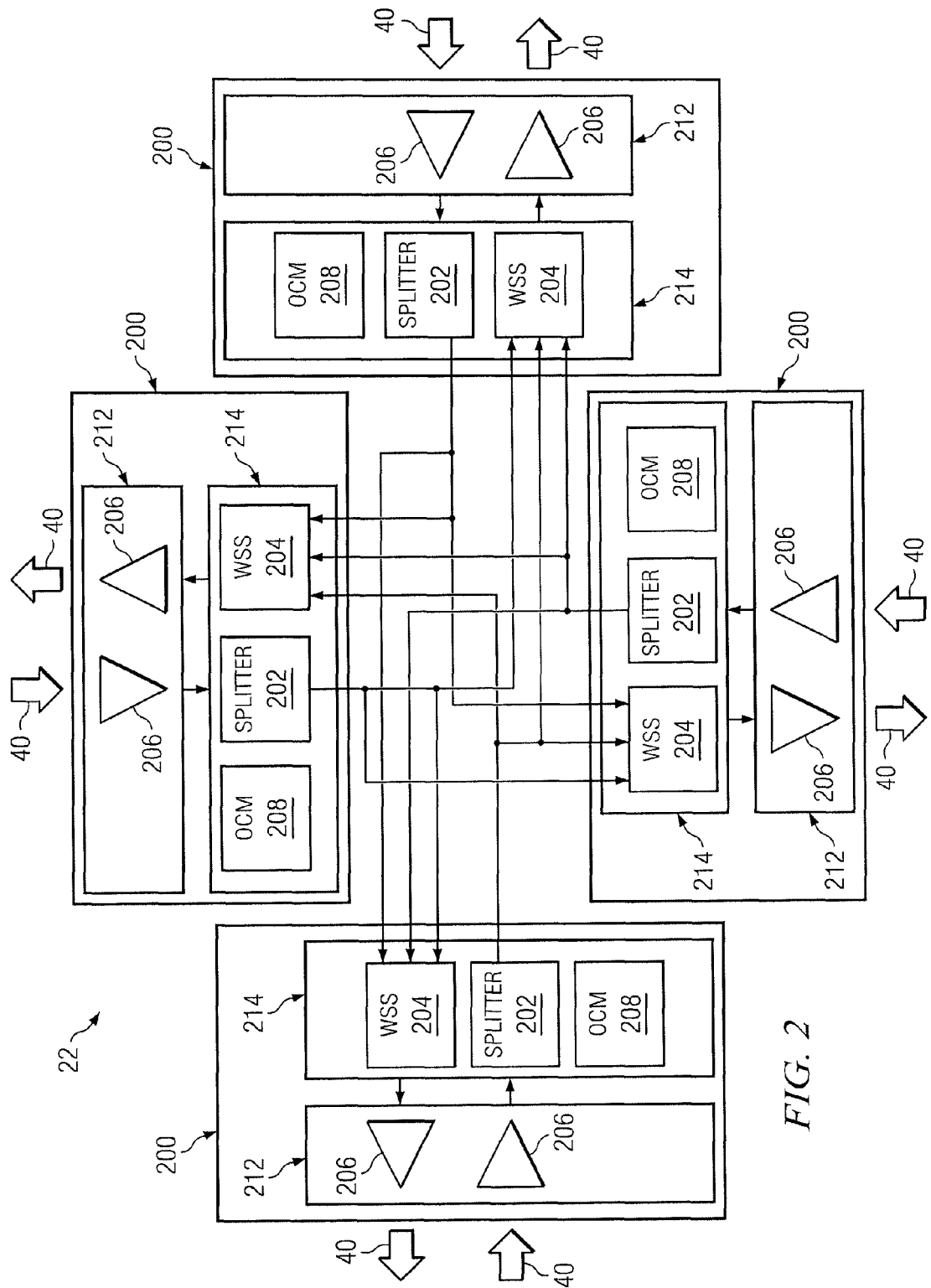
FIG. 2 illustrates a node with a plurality of degrees, in accordance with certain embodiments of the present disclosure.

FIG. 2 illustrates a node 22 with a plurality of degrees 200, in accordance with certain embodiments of the present disclosure. In the illustration, four degrees 200 are shown, but more or fewer degrees 200 may be present in a given configuration. Each degree 200 of node 22 may include splitter 202, wavelength selective switch (WSS) 204, optical channel monitor (OCM) 208, and one or more amplifier(s) 206. In operation, degree 200 of node receives the multiplexed wavelengths 40 from another degree 200 of node 22, another node 22, or some other portion of network system 10. The channels comprising the multiplexed wavelengths 40 incoming to degree 200 of node 22 may be added, dropped, and/or amplified before exiting degree 200 of node 22.

Amplifier 206 may be used to amplify the multiplexed wavelengths 40. Amplifier 206 may be positioned before and/or after certain lengths of fiber 26. Amplifier 206 may comprise an optical repeater that amplifies the optical signal. This amplification may be performed without opto-electrical or electro-optical conversion. In some embodiments, amplifier 206 may comprise an optical fiber doped with a rare-earth element. When a signal passes through the fiber, external energy is applied to excite the atoms of the doped portion of the optical fiber, which increases the intensity of the optical signal. As an example, amplifier 206 may comprise an erbium-doped fiber amplifier (EDFA). However, any other suitable amplifier 206 may be used. In the illustrated embodiment, each degree 200 of node 22 has a plurality of amplifiers 206 on an amplifier card 212. Amplifier card 212 may, in some embodiments, also be configured to gather information about multiplexed wavelengths 40, as described in more detail below with respect to FIGS. 6-10. Although the figure shows each degree 200 with its own amplifier card 212, there may be a single amplifier card 212 for some or all degrees 200 of node 22 or multiple nodes 22.

When the optical strength of the multiplexed wavelengths 40 reaches a certain point, amplifier 206 may reach its maximum linear response. Past this point, amplifier 206 may behave in a non-linear fashion (referred to as being "saturated"). At these levels, the multiplexed wavelengths 40 may be referred to as a "saturating signal." When amplifier 206 is supplied with a saturating signal, it may experience greater degrees of certain negative effects such as polarization hole burning (PHB). PHB may act to create a difference in the amount of amplified spontaneous emission noise in the same SOP as the saturating signal and the amplified spontaneous emission noise in the SOP orthogonal to the saturating signal. This difference leads to an overall decrease in the signal-to-noise ratio. Additionally, the magnitude of the decrease is dependent on the polarization state of the saturating signal and thus varies over time. This can result in both a reduction of signal quality and a time-varying signal quality at later nodes 22. The effects of PHB can be mitigated through the use of ghost channels generated from the Amplified Spontaneous Emission (ASE) noise present within network system 10, as described in more detail below with reference to FIGS. 3-13. After amplification, if required, the multiplexed wavelengths 40 may then pass to splitter 202.

Splitter 202 may include any device or component of a device which may be configured to reproduce the multiplexed wavelengths 40 (at greater or lesser magnitudes) before passing on multiple copies of the multiplexed wavelengths 40 to other components of node 22 or to other nodes 22 of network system 10. One such copy of multiplexed wavelengths 40 may be passed to WSS 204. WSS 204 may include any device or component of a device which may be configured to receive, combine, add, drop, and/or amplify the component channels of the incoming multiplexed wavelengths 40 transmitted from other degrees 200 of node 22 or other nodes 22 of network system 10. In some embodiments, WSS 204 may be configured to generate ghost channels and/or amplify or attenuate previously generated ghost channels, as described in more detail below with reference to FIGS. 3-5.

OCM 208 may include any component or set of components operable to provide information on the optical power of the individual optical channels comprising the multiplexed wavelengths 40. In some embodiments, OCM 208 may be an integrated part of switch card 214, such as that found on the Fujitsu Flashwave 7500 ROADM and Flashwave 9500 ROADM. In other embodiments, OCM 208 may be a stand-alone component, or the functions of OCM 208 may be performed by WSS 204 or any other appropriately configured component of node 22. In operation, OCM 208 may measure at least the optical power of the signal component channels in order to provide this power information to other components of node 22 for the appropriate generation, selection, management, and optimization of ghost channels for mitigating the effects of PHB. Switch card 214, or a component of switch card 214, may also be configured to provide the functions of splitter 202, WSS 204, OCM 208, or any other necessary functions, such as the maintenance of information regarding the current ghost channel load of degree 200, as described in more detail below with reference to FIGS. 6-10.

Figure 3:
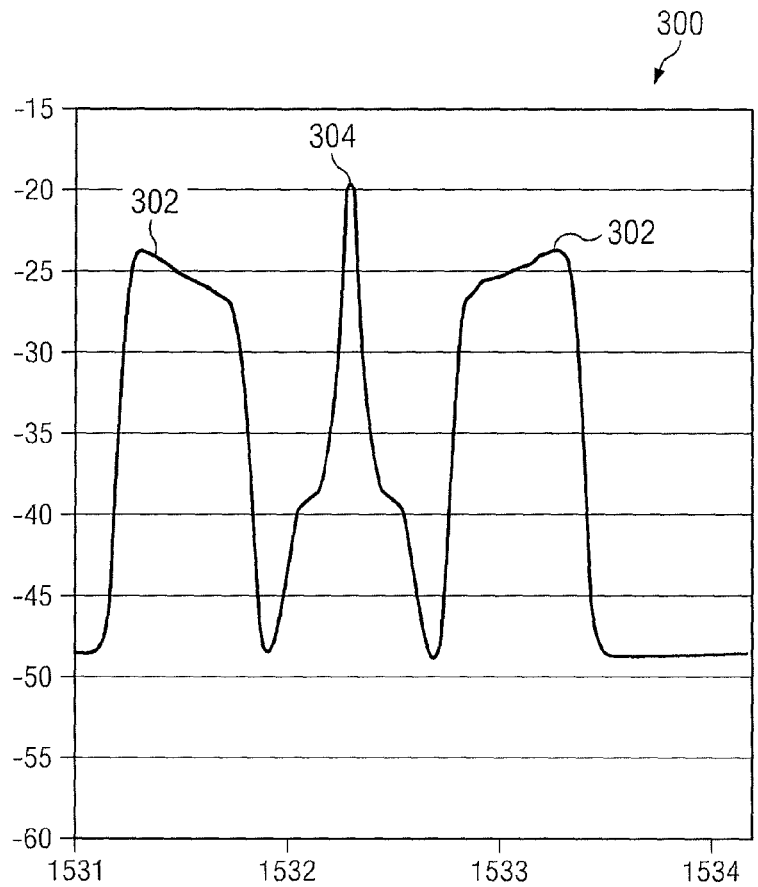
FIG. 3 illustrates a graph of a traffic channel surrounded on either side by ghost channels, in accordance with certain embodiments of the present disclosure.

FIG. 3 illustrates a graph 300 of a traffic channel 304 surrounded on either side by ghost channels 302, in accordance with certain embodiments of the present disclosure. In the illustrated embodiment, traffic channel 304 and ghost channels 302 are shown at specific wavelengths and specific amplitudes. These and other specific properties of traffic channel 304 and ghost channels 302 are intended for illustrative purposes only, and are in no way intended to limit the scope of the present disclosure.

In some embodiments, node 22 comprises certain modules configured to generate ghost channels 302 surrounding traffic channel 304. These ghost channels 302 may operate to reduce the deleterious effects of PHB. A ghost channel 302 generally refers to the propagation of optical energy through a communication channel of network system 10 without transmitting any signal information. Ghost channels 302 may be treated like other channels in need of amplification and/or propagation, but do not carry signal information.

Ghost channels 302 have been amplified to have an optical strength at or near the optical strength of traffic channel 304 as described in more detail below with reference to FIG. 4. Traffic channel 304 is a channel within a multi-channel optical signal that is carrying information along its carrier wavelength at a given moment. Generation, selection, management, and optimization of the ghost channels are discussed in more detail below with reference to FIGS. 4-13.

In some embodiments, traffic channel 304 may have only a single ghost channel 302 on either side. In other embodiments, there may be two, four, or any number less than the current capacity of network system 10. In some configurations, the use of higher numbers of ghost channels 302 may result in the possibility of feedback loops within network system 10. A given implementation may balance the desire for increasing the number of ghost channels 302 (and the corresponding decrease in the effects of PHB) and the desire to avoid feedback.

A given channel may have one or more "neighbor" channels. Neighbor channels are defined generally to be those that are within a certain wavelength distance of a given channel.

For instance, if network 10 has implemented a channel separation of 50 GHz (~0.4 nm), then channels at 1544.92 nm and 1545.72 nm may be the neighbors of the channel at 1545.32 nm. In other embodiments, a neighbor channel may be defined to be within an optical bandwidth equivalent to two or more times the channel spacing bandwidth (e.g., 50 GHz in the illustrative example), depending on the system's design criteria (such as the fear of signal interference and the intrinsic properties of the chosen carrier wavelength). Neighbor channels may also be said to "surround" a signal channel.

The effects of PHB may be most severe in situations where a particular traffic channel 304 is isolated from other traffic channels 304. If network system 10 is operating at full capacity, with all channels carrying information at the same time, then each operating channel is surrounded by other operating channels. In such a case, the surrounding channels function to mitigate the effects of PHB for any given channel. However, rarely does network system 10 operate at such a full capacity. Often only a percentage of the communication channels carry information at any given time.

Some prior solutions have randomly rotated the SOP of communication signals so that PHB effects will not be severe in any particular state of polarization. However, such solutions may be cost prohibitive to implement and, depending on the chosen implementation for rotating the SOP of the saturating signal, may not be able to successfully handle dynamic loading of channels across network system 10 (situations where the number and identity of information-carrying channels changes over time). In such situations, PHB effects may be mitigated by surrounding a communication channel with ghost channels.

In some embodiments, traffic channel 304 may be surrounded by ghost channels if it does not have another traffic channel 304 sufficiently nearby. This determination may be made in accordance with a set of predetermined rules. For instance, if, for a first optical signal, the next nearest optical signal is more than 20 channels away, then the first optical signal may require accompanying ghost channels in order to mitigate the effects of polarization hole burning. The more isolated a signal, the stronger the need for ghost channels. Below are example situations in which it might be desirable to produce ghost channels 302 for a given traffic channel 304 (denoted by $\lambda_i$).

if ... $\lambda_i \in \{ch1, \ldots, ch22\}$ ... and ... $\lambda_{i-1}$ & $\lambda_{i+1} \notin \{ch1, \ldots, ch23\}$ and N={1, ..., 42},
$\lambda_{i-1}$, $\lambda_{i+1}$ are channels adjacent to $\lambda_i$ and N is the total number of channels propagating in a span.

if ... $\lambda_i \in \{ch23, \ldots, ch44\}$ ... and ... $\lambda_{i-1}$ & $\lambda_{i+1} \in \{ch22, \ldots, ch44\}$, and N={1, ..., 42}
$\lambda_{i-1}$, $\lambda_{i+1}$ are channels adjacent to $\lambda_i$. and N is the total number of channels propagating in a span.

if ... $\lambda_i$, $\lambda_{i+1} \in \{ch1, \ldots, ch22\}$ ... and ... $\lambda_{i-1}$ & $\lambda_{i+2} \notin \{ch1, \ldots, ch23\}$, and N={2, ..., 42}
$\lambda_{i-1}$, $\lambda_{i+1}$ are channels adjacent to $\lambda_i$ and $\lambda_i$, $\lambda_{i+2}$ are channels adjacent to $\lambda_{i+1}$. N is the total number of channels propagating in a span.

if ... $\lambda_i$, $\lambda_{i+1} \in \{ch23, \ldots, ch44\}$ ... and ... $\lambda_{i-1}$ & $\lambda_{i+2} \notin \{ch22, \ldots, ch44\}$, and N={2, ..., 42}
$\lambda_{i-1}$, $\lambda_{i+1}$ are channels adjacent to $\lambda_i$ and $\lambda_i$, $\lambda_{i+2}$ are channels adjacent to $\lambda_{i+1}$. N is the total number of channels propagating in a span.

In some embodiments, there may also be rules to determine when ghost channels 302 may not be generated. For example, if traffic channel 304 (denoted by $\lambda_i$) falls within the rule described below, then it may not be sufficiently isolated to warrant the generation of ghost channels 302.

if ... n( ..., $\lambda_{i-1}$, $\lambda_i$, $\lambda_{i+1}$, ... )≧3 ... and ( ..., $\lambda_{i-1}$, $\lambda_i$, $\lambda_{i+1}$, ... )∈{ch1, ..., ch44}, and N={3 ..., 44}
..., $\lambda_{i-1}$, $\lambda_i$, $\lambda_{i+1}$, ... are neighbouring channels, n is the number of neighbouring channels, and N is the total number of channels propagating in a span.

Figure 4:
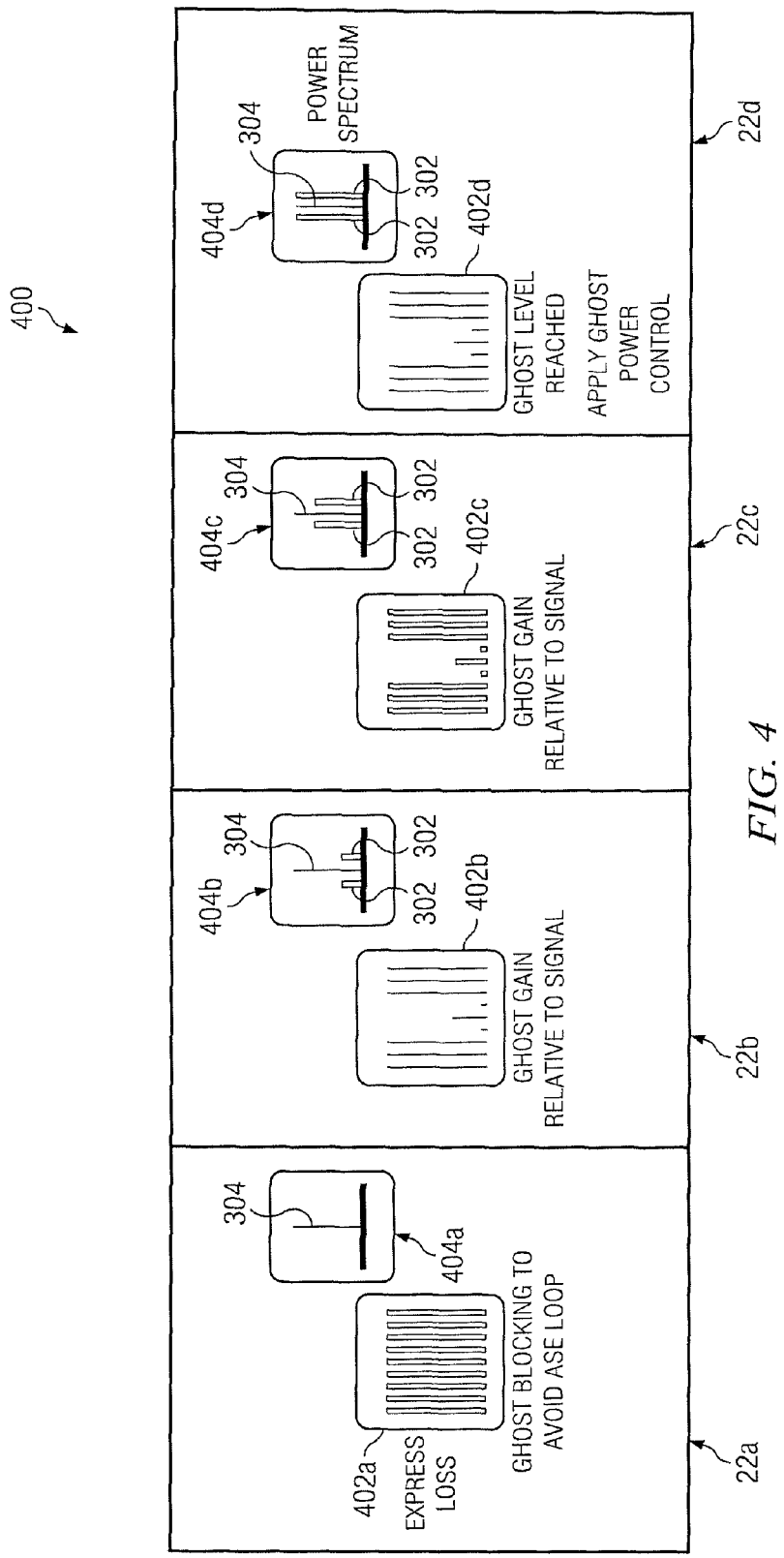
FIG. 4 illustrates an optical amplification scheme for generating ghost channels, in accordance with certain embodiments of the present disclosure.

FIG. 4 illustrates an optical amplification scheme 400 for generating ghost channels 302, in accordance with certain embodiments of the present disclosure. In the illustrated embodiment, traffic channel 304 and ghost channels 302 are shown at specific amplitudes and separations. These and other specific properties of traffic channel 304 and ghost channels 302 are intended for illustrative purposes only, and are in no way intended to limit the scope of the present disclosure. When traffic channel 304 is amplified, e.g., by amplifier 206 of node 22, a certain amount of noise is introduced through a phenomenon known as spontaneous emission. The amplification of traffic channel 304 may also amplify this noise, resulting in amplified spontaneous emission (ASE), an undesirable and problematic noise source, particularly for long-haul systems where traffic channel 304 may be amplified multiple times along its path. ASE is typically absorbed or extracted from network system 10 in order to maintain an acceptable signal to noise ratio.

However, controlling the location and magnitude of ASE may provide a source for the generation of ghost channels. Referring back to FIG. 4, four nodes 22 of network system 10 are shown, labeled as nodes 22a, 22b, 22c, and 22d. These labels are intended for clarity of discussion and are in no way intended to limit the scope of this disclosure. A traffic channel 304 may be added at node 22a. At node 22a, ASE at all incoming channels may be blocked, as shown in loss diagram 402a. Power spectrum 404a demonstrates that, as traffic channel 304 is transmitted from node 22a to node 22b, only traffic channel 304 is transmitted. Loss diagrams 402 and power spectrums 404 are provided for illustrative purposes only. As an example, in some embodiments, there may be multiple traffic channels 304 at varying separations.

When traffic channel 304 is amplified at node 22b, the ASE in the channels neighboring traffic channel 304 are not absorbed or extracted. The ASE in these neighboring channels may be allowed to grow to a certain point in order to provide the appropriate ghost channels 302 surrounding traffic channel 304. Loss diagram 402b shows that the block levels applied to the neighbor channels have been reduced to a substantially lower level. This may allow the ASE in the neighbor channels to grow, generating a ghost channel, as shown in power spectrum diagram 404b.

At this stage, ghost channels 302 may have a low optical strength relative to traffic channel 304. As traffic channel 304 and ghost channels 302 are passed through a third node 22c, ghost channels 302 may be amplified to a greater optical strength. Loss diagram 402c shows that the block levels applied to the neighbor channels are at the same substantially lower level as those in loss diagram 402b. This may allow the ASE in the neighbor channels to continue to grow, allowing ghost channels 302 to gain optical power, as shown in power spectrum diagram 404c.

This amplification may continue through a fourth node 22d until the optical strength of ghost channels 302 is at or near the optical strength of traffic channel 304. At this stage ghost channels 302 may be at their most efficient in mitigating the effects of polarization hole burning without overcoming traffic channel 304. Loss diagram 402d shows that the block levels applied to the neighbor channels have been raised relative to loss diagram 402c, but are still at a substantially lower level than in loss diagram 402a. This may allow the ASE in the neighbor channels to be capped at a certain optical power level, allowing ghost channels 302 to propagate at an optical power level substantially equal to traffic channel 304, as shown in power spectrum diagram 404d.

Although this figure depicts this process taking place over the course of four nodes 22a-D, a particular implementation may take more or fewer nodes to get ghost channels 302 to an appropriate optical strength.

In some embodiments, degree 200 of node 22 may amplify ghost channels 302. As part of the amplification, degree 200 may also determine whether ghost channel 302 needs to be amplified, or if it is already of sufficient magnitude. For instance, in some embodiments, it may be desirable to cap amplification of a ghost channel 302 as described in more detail below with reference to FIGS. 5-13. In other embodiments, the amplification and measurement may be done by more or different components of network system 10.

Figures 5, 6:
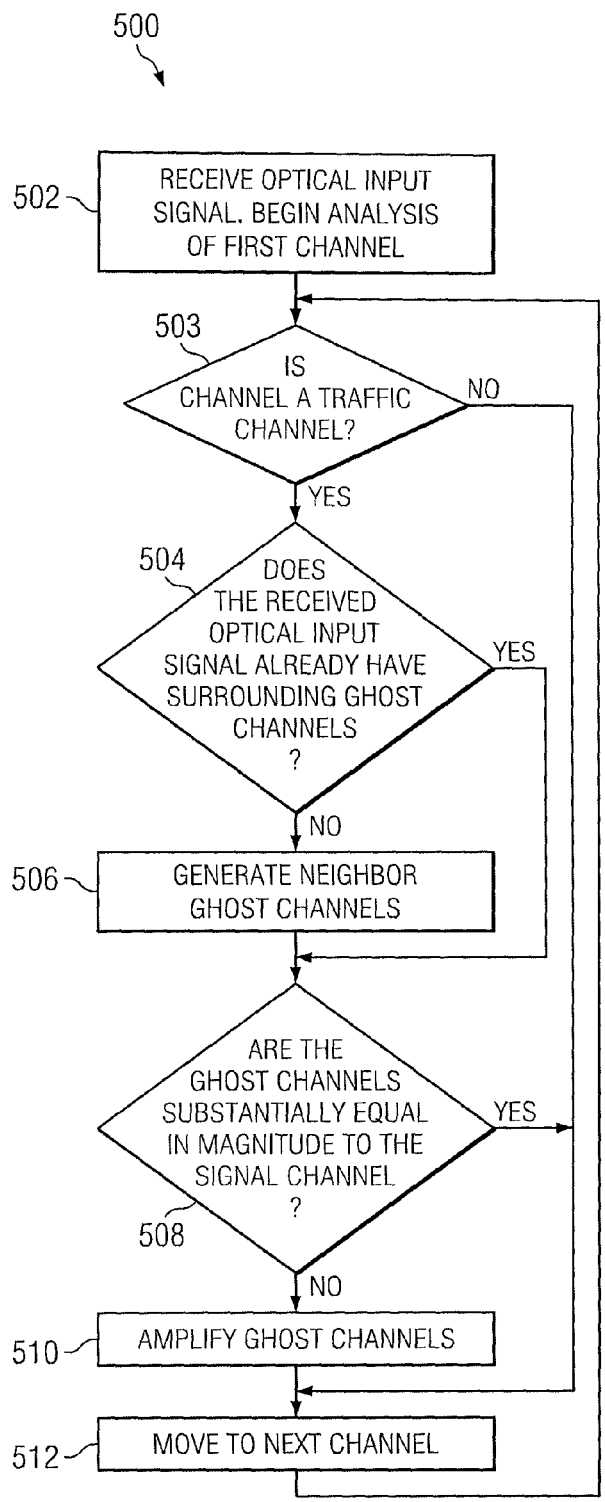
FIG. 5 is a flowchart illustrating one embodiment of a method of mitigating the effects of polarization hole burning, in accordance with certain embodiments of the present disclosure.
FIG. 6 illustrates a table for storing information regarding the validity of a channel incoming to a degree of node, in accordance with certain embodiments of the present disclosure.

FIG. 5 is a flowchart illustrating one embodiment of a method 500 of mitigating the effects of polarization hole burning, in accordance with certain embodiments of the present disclosure. Method 500 includes checking an incoming traffic channel 304 for the existence of neighboring ghost channels 302, generating ghost channels 302 if necessary, and amplifying ghost channels 302 if necessary.

According to one embodiment, method 500 preferably begins at step 502. Teachings of the present disclosure may be implemented in a variety of configurations of nodes 22 and network system 10. As such, the preferred initialization point for method 500 and the order of steps 502-512 comprising method 500 may depend on the implementation chosen. As described in more detail above with reference to FIG. 1, node 22 may be associated with a number of degrees 200, each receiving multiplexed wavelengths 40 from a different portion of network system 10. Depending on the implementation chosen, method 500 may be performed on some, all, or none of degrees 200 of node 22. Additionally, multiplexed wavelengths 40 may be a multi-channel signal which may be demultiplexed into its component channels. Depending on the implementation chosen, method 500 may be performed on some, all, or none of the traffic channels 304 of multiplexed wavelengths 40.

At step 502, degree 200 of node 22 receives multiplexed wavelengths 40. After receiving multiplexed wavelengths 40, method 500 may begin to analyze a first channel constituting multiplexed wavelengths 40. After analyzing that channel, method 500 may proceed to step 503, where node 22 may determine whether the channel under consideration is a traffic channel 304. In some embodiments, determining whether a given channel is a traffic channel 304 may constitute examining the WCS and WCF bits for that channel, as described in more detail below with reference to FIGS. 6-10.

If the channel is not a traffic channel 304, then method 500 may proceed to step 512, where method 500 may proceed to examine the next channel before returning to step 502. If the channel under consideration is a traffic channel 304, then method 500 may proceed to step 504, where node 22 may determine whether there are existing ghost channels 302 for traffic channel 304. In some embodiments, step 504 may be performed by software controlling wavelength selection switch 204 of node 22, or any other appropriately configured measurement module, as described in more detail above with reference to FIGS. 1-4. In other embodiments, step 504 may be performed by hardware, firmware, or any other software module, including the operating system controlling node 22 configured to determine the presence of ghost channels 302.

If no ghost channels 302 are currently present, method 500 may proceed to step 506, where node 22 may generate ghost channels 302. In some embodiments, step 506 may be performed by wavelength selection switch 204 of node 22, or any other ghost channel generation module configured to modify the blocking level of ASE in appropriate channels, as described in more detail above with reference to FIGS. 1-4. After generating ghost channels 302, method 500 may proceed to step 508. If, in step 504, method 500 determined that there were extant ghost channels 302, method 500 may proceed directly to step 508.

At step 508, method 500 may determine the power of ghost channels 302, as measured by optical channel monitor 208 or any other appropriately configured power monitor, as described in more detail above with reference to FIGS. 1-4. Method 500 may then compare the power of ghost channels 302 to the power of the associated traffic channel 304. In some embodiments, this comparison may be performed by wavelength selection switch 204 of node 22, or any other appropriately configured comparator, as described in more detail above with reference to FIGS. 1-4. If ghost channels 302 are not of a sufficient magnitude, then method 500 may proceed to step 510, where ghost channels 302 are amplified, as described in more detail above with reference to FIGS. 1-4. After amplification, method 500 may proceed to step 512.

If, in step 508, method 500 determined that extant ghost channels 302 were already of a sufficient magnitude, then method 500 may proceed directly to step 512. At step 512, method 500 may proceed to examine the next channel before returning to step 502.

Although FIG. 5 discloses a particular number of steps to be taken with respect to method 500, method 500 may be executed with more or fewer steps than those depicted in FIG. 5. In addition, although FIG. 5 discloses a certain order of steps comprising method 500, the steps comprising method 500 may be completed in any suitable order. For example, in the embodiment of method 500 shown, node 22 determines whether ghost channels 302 are substantially equal in magnitude to traffic channel 304. However, in short-distance systems where design considerations may not require concern over potential overgrowth of ghost channels, these steps may not be necessary. Additionally, method 500 may also include additional steps concerning the determination of how close a ghost channel 302 may be in order to decide if additional ghost channels 302 may be necessary.

Certain embodiments of the invention may provide one or more technical advantages. A technical advantage of one embodiment may be that using ghost channels 302 to mitigate the effects of polarization hole burning allows for a more robust solution to PHB effects in dynamically loaded optical communication network systems 10. Another advantage may be that, since the methods and systems disclosed herein may be implemented in pre-existing hardware and/or software, the implementation costs and difficulties may be substantially reduced.

Effectively mitigating the effects of polarization hole burning in an optical communication system may require systems and/or methods of effectively managing, selecting, and/or optimizing the generated ghost channels 302. Referring again to FIG. 2, in order to effectively manage ghost channel generation, it may be desirable to have the degrees 200 of node 22 communicate with one another. Intranodal communication may be used for many purposes, including the direction of incoming traffic over different output paths. Intranodal communication may also be used for communicating the current state of particular channels passing through each degree 200 of node 22. This information can be important in the management of ghost channels 302 used for polarization hole burning mitigation.

In some embodiments, a degree 200 may need to add a ghost channel 302, or pass-through (and potentially amplify) an existing ghost channel 302 from another degree 200 of node 22. In order to effectively balance the load of the ghost channels across node 22, it may be important to know the current and potential sources for ghost channels. However, the information required to effectively manage the ghost channel sources may not be readily available at each degree 200 of node 22. For instance, the splitter input power for a given channel at Degree 1 may not be available to WSS 204 of Degree 4. Without this information, Degree 4 may be unable to correctly determine whether to source a ghost channel from that given channel. In order to overcome these obstacles, degrees 200 may share information.

In some embodiments, degree 200 may collect certain pieces of information regarding the channels incoming to that degree 200. That information may include a wavelength channel signal bit ("WCS"), a wavelength channel failure indicator ("WCF"), and the splitter input power for each channel. The WCS and WCF bits may be collected by amplifier card 212 of degree 200 and splitter input power may be collected by OCM 208 of degree 200. However, these functions may be performed by the same component, different components, or any appropriately configured channel information module.

The WCS bit may be used to indicate whether a particular wavelength is intended to be present, e.g., whether information is being sent through that channel. In some embodiments, a "1" may indicate that a wavelength is intended to be present and a "0" may indicate that a wavelength is not intended to be present. The WCF bit may be used to indicate whether a wavelength is actually present. Although a wavelength may be intended to be present, some failure may have occurred. In some embodiments, a "1" may indicate that actual light is present, while a "0" may indicate that no light is present. These indicators, or others like them, may work together to indicate that a particular channel is "valid" for the purposes of ghost channel sourcing. In the illustrated configuration, a valid channel is one that is both intended to carry information and actually carrying information. However, other configuration may be based on different design decisions and define a valid channel differently without departing from the scope of this disclosure.

In some embodiments, each degree 200 may assemble a table for the desired channel validity information, with an entry for each incoming channel. These tables are discussed below in further detail with reference to FIGS. 5-9. Each degree 200 may then transmit these tables to every other degree 200 of node 22 in order to maximize information sharing and subsequent decision making.

FIG. 6 illustrates a table 600 for storing information regarding the validity of a channel incoming to a degree 200 of node 22, in accordance with certain embodiments of the present disclosure. Table 600 may comprise a plurality of entries 602, with each entry 602 corresponding to an incoming channel. For each entry 602 table 600 may store one or more value(s) 604. In some embodiments, values 604 are the WCS and WCF values for each incoming channel. WCS and WCF values are discussed in more detail above with reference to FIG. 3. As an illustrative example, entry 602 for channel 1 may have a value of "1" for WCS and "0" for WCF. This may indicate that channel 1 is intended to be operational, but that no light is present. Entry 602 for channel 2 may have a "1" for WCS, indicating that it is intended to be operational, and a "1" for WCF, indicating that light is, in fact, present. The channel validity information of table 600 may then be passed on to a portion of degree 200 configured to measure optical strength of incoming channels. In some embodiments, the gathering of data in table 600 is performed by amplifier card 212 within degree 200 of node 22. Amplifier card 212 may then send table 600 to switch card 214 in order to gather information regarding the optical power of the incoming channels as described in more detail below with reference to FIGS. 7-9. However, in other embodiments, table 600 may be generated within switch card 214 of degree 200 or by any channel information module of node 22 configured to gather the appropriate channel validity information.

FIG. 7 illustrates a table 700 for storing information regarding the validity and signal strength of a channel incoming to a particular degree 200 of node 22, in accordance with certain embodiments of the present disclosure. Table 700 may comprise a plurality of entries 702, with each entry 702 corresponding to an incoming channel. For each entry 702, table 700 may store one or more value(s) 704. In some embodiments, values 704 are the WCS, WCF, and splitter input power for each incoming channel. WCS and WCF values are discussed in more detail above with reference to FIGS. 2 and 6. OCM 208 of degree 200 may measure the splitter input power for each channel and record the information in table 700. Table 700 may then be broadcast to every other degree 200 of node 22.

In some embodiments, switch card 214 of degree 200 receives channel validity information from amplifier card 212 (or some other channel information module), as described in more detail above with reference to FIG. 6 (e.g., in the form of table 600) and appends to that information regarding the optical power of the incoming channels from OCM 208 (e.g., in the form of splitter input power in table 700). However, in other embodiments, these functions may be performed by the same component. For instance, the channel information module and switch card 214 may be an integral component configured to determine WCS bits, WCF bits, and to measure splitter input power at the same time without the need for separate tables 600 and 700.

Once the information illustrated in table 700 has been broadcast to other degrees 200 of node 22, it may be necessary or efficient for each degree 200 to consolidate the tables 700 received from each of the other degrees 200.

FIG. 8 illustrates a series of tables 800 representing the consolidated information received from other degrees 200 of node 22, in accordance with certain embodiments of the present disclosure. In some embodiments, a degree 200 of node 22 may receive tables from other degrees 200 of node 22 containing information regarding the validity and optical power of certain channels, as described in more detail above with reference to FIGS. 6-7. Aggregating such data in a way such that the data is available for each channel may be desirable, such as is depicted in table(s) 800. It may also be desirable to include "freshness" data to indicate how recently the data has been received.

Each table 800 may represent the aggregated information for a particular channel. In some embodiments, there is a table 800 corresponding to each incoming channel (as an example only, the illustrated embodiment includes eighty-eight channels, so there are eighty-eight tables 800). Each table 800 may include a plurality of entries 802, with each entry 802 corresponding to a degree 200 in node 22. Some configurations may also find it more desirable or efficient to combine one or more table(s) 800 into a single table 800, or to split a single table 800 into smaller tables.

For each entry 802 table 800 may store one or more value(s) 804. In some embodiments, values 804 are the WCS bit, WCF bit, splitter input power, and freshness values for each degree. WCS, WCF, and splitter input power values are described in more detail above with reference to FIGS. 6-7. The "Fresh" value of table 800 may be used to indicate whether the remaining values 804 of table 800 have been recently updated (or sufficiently "fresh"). In some embodiments, switch card 214 of degree 200 may determine whether the data stored in table 800 has been refreshed within a predetermined amount of time, e.g., five seconds. If the data has been received within that time period, then the Fresh value 804 may be marked with a "1" to indicate that the data is sufficiently fresh; if is has not, then it may be marked with a "0" to indicate that the data is stale.

In addition to information regarding the validity and freshness of the incoming channels at each degree 200 of node 22, it may also be desirable to know what, if any, ghost channels are already sourced from a degree 200.

FIG. 9 illustrates a table 900 for storing information regarding the current ghost channel load for degrees 200 in node 22, in accordance with certain embodiments of the present disclosure. Table 900 may include a plurality of entries 902, with each entry 902 corresponding to a degree 200 in node 22. For each entry 902 table 900 may store one or more value(s) 904. In some embodiments, value 904 is the current ghost channel count for each degree 200 in node 22. The ghost channel count is the number of ghost channels that are currently sourced from a particular degree. The data in current ghost count 904 may be used to efficiently balance the ghost channel load within node 22. This information may allow the distribution of ghost channels across degrees 200 within node 22, which may in turn improve operational efficiency of node 22 and network system 10. Table 900 may, in some embodiments, be stored and managed by the software code that operates WSS 204 of degree 200. In other embodiments, table, 900 may be managed by an overarching node management system, and implemented in software, hardware, or firmware, or some combination thereof. The information in table 900 regarding the current ghost channel load of degrees 200 may be combined with the channel input information in table 600 to better manage the ghost channels used to mitigate the effects of polarization hole burning.

Figure 10:
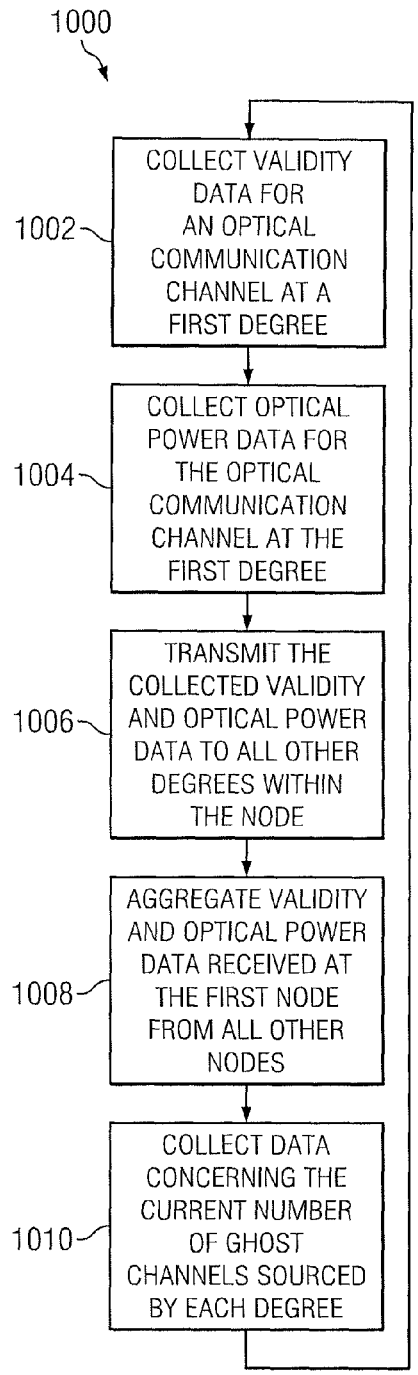
FIG. 10 is a flowchart illustrating one embodiment of a method of managing the selection of ghost channels in mitigating the effects of polarization hole burning, in accordance with certain embodiments of the present disclosure.

FIG. 10 is a flowchart illustrating one embodiment of a method 1000 of managing the selection of ghost channels in mitigating the effects of polarization hole burning, in accordance with certain embodiments of the present disclosure. Method 1000 includes collecting validity and optical power data for optical communication channels, transmitting that data to all degrees 200 within a node 22, aggregating received data, and collecting data concerning the current ghost channel loading.

According to one embodiment, method 1000 preferably begins at step 1002. Teachings of the present disclosure may be implemented in a variety of configurations of node and network system 10. As such, the preferred initialization point for method 1000 and the order of steps 1002-1010 comprising method 1000 may depend on the implementation chosen.

At step 1002, method 1000 collects validity data for an optical communication channel at a first degree 200 (as an example only, the WCS and WCF bits for the optical communication channel). In some embodiments, this step may be performed by a channel information module as described in more detail above with reference to FIGS. 6-9. After collecting this information method 1000 may proceed to step 1004.

At step 1004, method 1000 collects optical power data for the optical communication channel at each degree 200. In some embodiments, step 1004 may be performed by OCM 208 as described in more detail above with reference to FIGS. 6-9. After collecting this information method 1000 may proceed to step 1006.

At step 1006, method 1000 may transmit all of the collected validity and optical power data to all other degrees 200 within node 22. Step 1006 may be performed by switch card 214 as described in more detail above with reference to FIGS. 6-9. After transmitting this data, method 1000 may proceed to step 10101008.

At step 1008, method 1000 may aggregate the channel validity and optical power data received at each degree 200 from all other degrees 200 such that a composite picture of the data for a given channel may be formed. The aggregated validity and power data may be combined with a freshness value, indicating how recently the data had been retrieved. Step 1008 may be performed by switch card 214 as described in more detail above with reference to FIGS. 6-9. After aggregating and collecting this data, method 1000 may proceed to step 1010.

At step 1010, method 1000 may collect data regarding the current ghost channel load within node 22. This data may comprise information detailing which degrees 200 within node 22 are currently being used as ghost channel sources, as described in more detail above with reference to FIG. 9. After collecting this data, method 1000 may return to step 1002 to begin the data collection cycle again. In some embodiments, there may be a time delay, such as five seconds, before the cycle begins again. Such a time delay would be a design determination to suit the particular implementation of network system 10.

Although FIG. 10 discloses a particular number of steps to be taken with respect to method 1000, method 1000 may be executed with more or fewer steps than those depicted in FIG. 10. In addition, although FIG. 10 discloses a certain order of steps comprising method 1000, the steps comprising method 1000 may be completed in any suitable order. For example, in the embodiment of method 1000 shown, degree 200 of node 22 collects channel validity data and optical power data in two separate steps. In some embodiments, it may be desirable to separate these steps to have separate components of degree 200 perform these tasks. However, in other embodiments these steps may be performed simultaneously and/or by the same component of degree 200.

Certain embodiments of the invention may provide one or more technical advantages. A technical advantage of one embodiment may be that effective management of ghost channel selection can allow a network system to effectively balance the load that ghost channels may place on the system.

Along with managing the load balance of ghost channels 302 within node 22, it may also be beneficial to select the appropriate source for ghost channels 302 in order to reduce or eliminate the potential deleterious effects of feedback when mitigating the effects of polarization hole burning.

Figure 11:
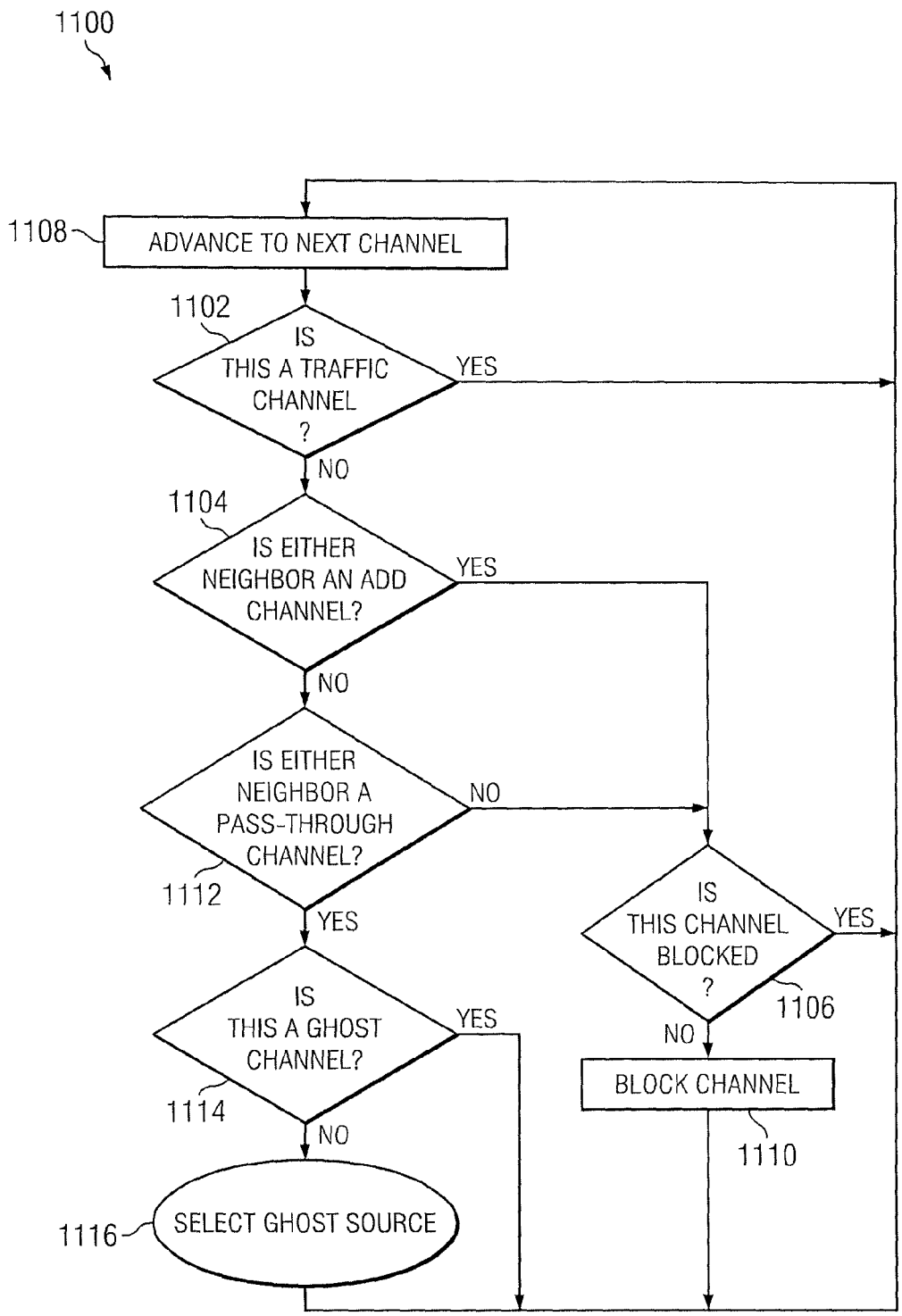
FIG. 11 is a flowchart illustrating one embodiment of a method of selecting ghost channels for use in mitigating the effects of polarization hole burning, in accordance with certain embodiments of the present disclosure.

FIG. 11 is a flowchart illustrating one embodiment of a method 1100 of selecting ghost channels for use in mitigating the effects of polarization hole burning, in accordance with certain embodiments of the present disclosure. Method 1100 includes checking each channel to see if it is a traffic channel, a blocked channel, a current ghost channel, or if its neighbor channels are add or pass-through channels. In operation, method 1100 determines whether, for a given channel, either neighbor channel will have a signal when it leaves degree 200. If it does, then the current channel may need to be blocked from use as a ghost channel in order to prevent undesirable feedback within network system 10. One point at which it may be effective to reduce feedback is at the point where a traffic channel is added. If the traffic channel is being added at node 22, then ghost channel 302 may not be immediately introduced at node 22. If a traffic channel is a pass through channel, then ghost channel 302 may be generated with less concern for feedback.

According to one embodiment, method 1100 preferably begins at step 1102. Teachings of the present disclosure may be implemented in a variety of configurations of communication system 10. As such, the preferred initialization point for method 1100 and the order of steps 1102-1116 comprising method 1100 may depend on the implementation chosen. In some embodiments, the steps of method 1100 may be performed by the software that manages WSS 204 of each degree 200. In other embodiments different steps may be performed by different pieces of software or different software modules within one piece of software, or may be implemented in hardware or firmware or any appropriate combination thereof configured to perform the method within each degree 200.

Beginning with a first channel, at step 1102, method 1100 determines whether, the first channel is a traffic channel. In some embodiments, determining whether a given channel is a traffic channel 304 may constitute examining the WCS and WCF bits for that channel, as described in more detail above with reference to FIGS. 6-10. If the channel is a traffic channel, then method 1100 may proceed to step 1108, wherein method 1100 advances to the next channel before returning to step 1102. If the channel is not a traffic channel, then method 1100 may proceed to step 1104.

At step 1104, method 1100 determines whether either channel neighboring the channel under consideration is an add channel. In some embodiments, an add channel is a channel on which traffic is added at WSS 204 of the degree 200 performing the method. In such a situation, sourcing a ghost channel may lead to undesirable feedback within network system 10. If either neighbor channel is an add channel, then method 1100 may proceed to step 1106. If neither neighbor channel is an add channel, then method 1100 may proceed to step 1112.

At step 1106 method 1100 may determine whether the channel under consideration is currently blocked. If it is blocked, then method 1100 may proceed to step 1108, wherein method 1100 advances to the next channel before returning to step 1102. If the current channel under consideration is not blocked, then method 1100 may proceed to step 1110, wherein the channel is blocked, before proceeding to step 1108.

At step 1112, method 1100 may determine whether either neighbor channel is a pass-through channel. In some embodiments, a pass-through channel is a channel on which traffic is received at the degree 200 and which is passed through WSS 204 of that degree 200. In the case of pass-through channels, sourcing a ghost channel from the channel under consideration may not run as high a risk of undesirable feedback within network system 10. If either neighbor channel is a pass-through channel, then method 1100 may proceed to step 1114. If neither neighbor channel is a pass-through channel, then method 1100 may proceed to step 1106.

At step 1114, method 1100 may determine whether the current channel is already being used to source a ghost channel. If it is, then method 1100 may proceed to step 1108, wherein method 1100 advances to the next channel before returning to step 1102. If it is not, then method 1100 may proceed to step 1116. At step 1116, method 1100 may select the current channel to source a ghost channel. The selection method may be simple or complex, depending on the particular implementation. In some embodiments, the ghost source may be selected from a calculated set of degrees with appropriate validity and optical power criteria, as described below in more detail with reference to FIG. 12.

Although FIG. 11 discloses a particular number of steps to be taken with respect to method 1100, method 1100 may be executed with more or fewer steps than those depicted in FIG. 11. In addition, although FIG. 11 discloses a certain order of steps comprising method 1100, the steps comprising method 1100 may be completed in any suitable order. For example, in the embodiment of method 1100 shown, channels with neighbors that will carry add channels after leaving degree 200 may be blocked. However, in some configurations it may be less important to guard against feedback and these steps may be reduced in scope or eliminated.

Figure 12:
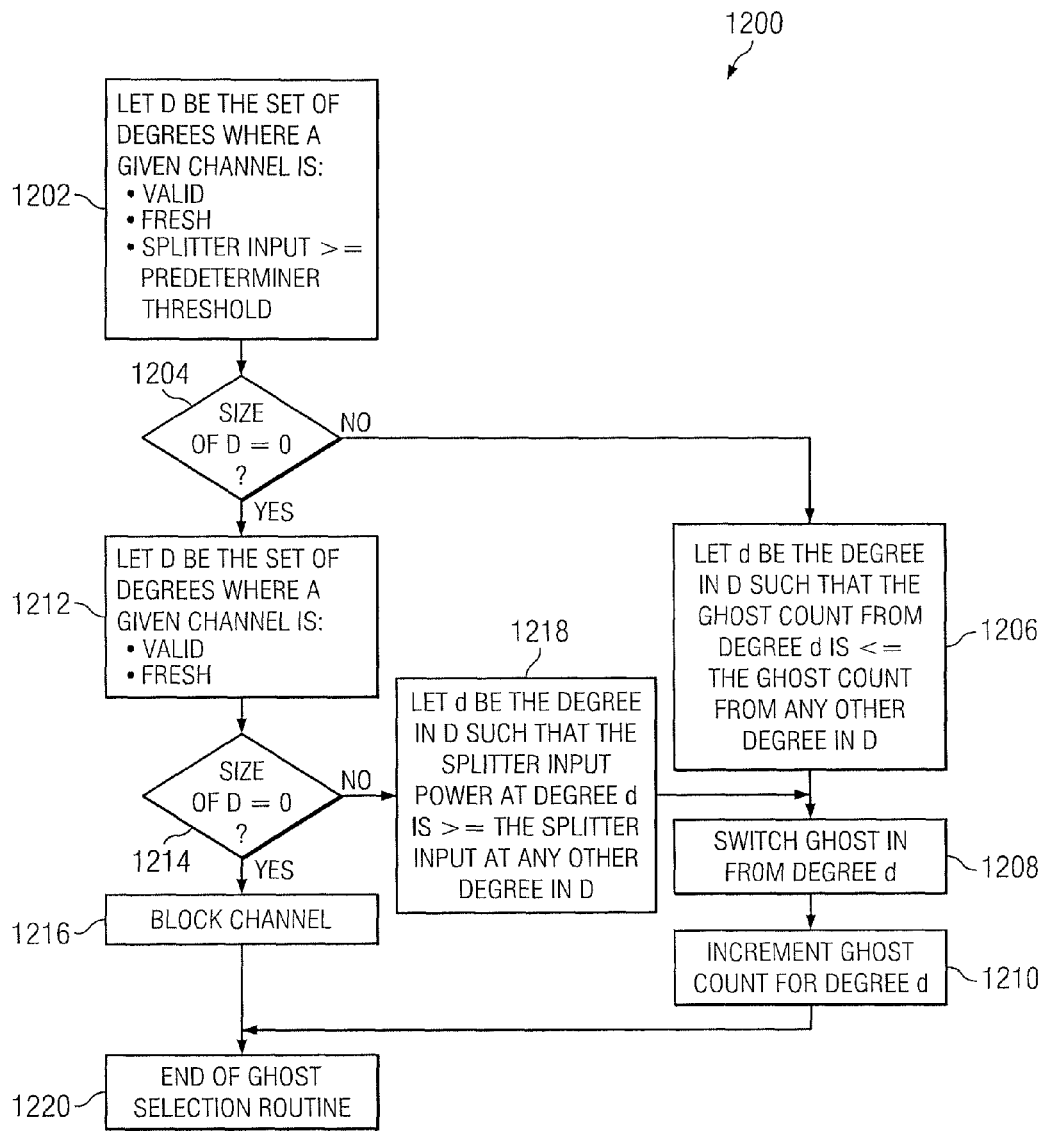
FIG. 12 is a flowchart illustrating one embodiment of a method of selecting the degree of node from which to select the appropriate ghost channels for mitigating the effects of polarization hole burning, in accordance with certain embodiments of the present disclosure.

FIG. 12 is a flowchart illustrating one embodiment of a method 1200 of selecting the degree 200 of node 22 from which to select the appropriate ghost channels for mitigating the effects of polarization hole burning, in accordance with certain embodiments of the present disclosure. Method 1200 includes selecting the source degree 200 for the ghost channel 302 identified above with reference to FIG. 11 by examining the validity and optical power values of channels within the degrees 200 of node 22, in order to maintain a desired level of load balancing across network system 10.

In operation, method 1200 may select the degree 200 of node 22 that can source a ghost channel 302 with the highest initial optical power (e.g., the ASE noise at the highest initial level) and/or the degree with the lowest current ghost channel count.

According to one embodiment, method 1200 preferably begins at step 1202. Teachings of the present disclosure may be implemented in a variety of configurations of communication system 10. As such, the preferred initialization point for method 1200 and the order of steps 1202-1220 comprising method 1200 may depend on the implementation chosen. In some embodiments, the steps of method 1200 may be performed by the software that manages WSS 204 of degree 200. In other embodiments different steps may be performed by different pieces of software or different software modules within one piece of software, or may be implemented in hardware or firmware or any appropriate combination thereof configured to perform the method within degree 200.

At step 1202, method 1200 may determine whether a given channel is valid, fresh, and has a splitter input power greater than or equal to a predetermined threshold. Channel validity, freshness, and optical power information are discussed in more detail above with reference to FIGS. 6-10. The predetermined threshold may be any value determined by the particular implementation of network system 10 to produce a likelihood of finding an appropriate ghost channel while maintaining the balance of ghost channel load across degrees 200 of node 22. The set of degrees 200 meeting both criteria is depicted in method 1200 by the letter "D." After examining each degree 200, the method may proceed to step 1204.

At step 1204, method 1200 may determine whether there are any degrees 200 within the set that met both criteria in step 1202 (e.g., whether D=0). If there are any sufficiently valid, fresh, and powerful channels in any degree 200 (D does not equal 0), then method 1200 may proceed to step 1206. If there are not, then method 1200 may proceed to step 1212.

At step 1206, method 1200 may determine which degree currently has the least number of ghost channels currently sourced. The gathering, collecting, and transmission of current ghost channel load information is described above in more detail with reference to FIGS. 6-10. In FIG. 12, this degree is denoted by the letter "d." After determining the appropriate degree, method 1200 may proceed to step 1208. At step 1208, the controller may switch in the designated ghost channel from the designated degree d. Method 1200 may then proceed to step 1210, where the ghost channel count for the designated degree is incremented, at which point method 1200 may proceed to step 1220, where method 1200 terminates.

If there are no sufficiently valid, fresh, powerful channels found at step 1204 (e.g., D=0), then method 1200 may proceed to step 1212, where method 1200 may limit the determination to the number of sufficiently valid and fresh channels (denoted by the letter "D."). After determining the number of valid and fresh channels, method 1200 may proceed to step 1214. At step 1214, the controller may determine if there were any valid and fresh channels found in step 1212. If there were no valid and fresh channels (D=0), then method 1200 may proceed to step 1216, where the channel under examination is blocked as a ghost source. After blocking the channel, method 1200 may proceed to step 1220, where method 1200 terminates.

If, in step 1214, there were one or more valid and fresh channels, then method 1200 may proceed to step 1218. At step 1218, method 1200 may determine which degree has the channel with the highest splitter input power. This degree is denoted by the letter "d" in the drawing. After making this determination, method 1200 may proceed to step 1208. At step 1208, method 1200 may switch in the ghost channel from the designated degree. As discussed above, after switching in the ghost channel, method 1200 may then proceed to step 1210, where the ghost count is incremented for the designated degree, and then to step 1220, where method 1200 terminates.

Although FIG. 12 discloses a particular number of steps to be taken with respect to method 1200, method 1200 may be executed with more or fewer steps than those depicted in FIG. 12. In addition, although FIG. 12 discloses a certain order of steps comprising method 1200, the steps comprising method 1200 may be completed in any suitable order. For example, in the embodiment of method 1200 shown, a choice may be made to switch in a channel with a splitter input of less than the full ghost threshold. However, in some configurations it may be desirable to only source ghost channels from channels with a splitter input greater than or equal to the full ghost threshold.

In order to maintain the effectiveness of a load balanced, ghost channel polarization hole burning mitigation scheme, it may be necessary or desirable to optimize that scheme for continued performance.

Figure 13:
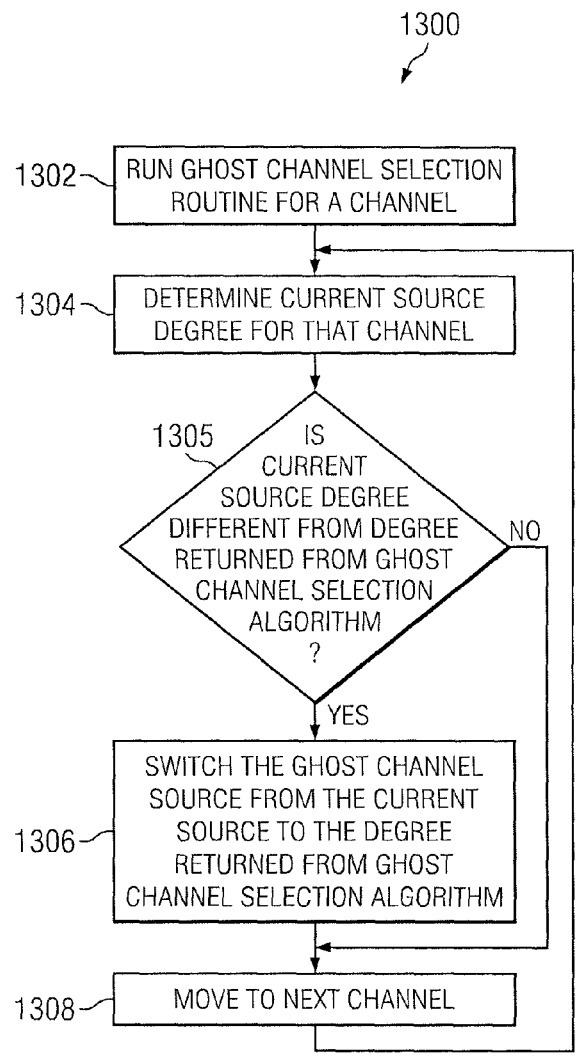
FIG. 13 is a flowchart illustrating one embodiment of a method of optimizing a ghost channel selection routine in order to mitigate the effects of polarization hole burning, in accordance with certain embodiments of the present disclosure.

FIG. 13 is a flowchart illustrating one embodiment of a method 1300 of optimizing a ghost channel selection routine in order to mitigate the effects of polarization hole burning, in accordance with certain embodiments of the present disclosure. Method 1300 includes periodically running a ghost channel selection algorithm in order to ensure that the most effective degree 200 of node 22 is the current source for a ghost channel 302.

According to one embodiment, method 1300 preferably begins at step 1302. Teachings of the present disclosure may be implemented in a variety of configurations of communication system 10. As such, the preferred initialization point for method 1300 and the order of steps 1302-1308 comprising method 1300 may depend on the implementation chosen. In some embodiments, the steps of method 1300 may be performed by the software that manages WSS 204 of degree 200. In other embodiments different steps may be performed by different pieces of software or different software modules within one piece of software, or may be implemented in hardware or firmware or any appropriate combination thereof configured to perform the method within degree 200.

At step 1302, method 1300 may run a ghost selection routine for a first channel. The ghost selection routine may be simple or complex, depending on the configuration of network system 10. In some embodiments, the ghost source may be selected from a calculated set of degrees with appropriate validity and optical power criteria, as described in more detail above with reference to FIGS. 11-12. Once the ghost selection routine has run for the first channel, method 1300 may proceed to step 1304.

At step 1304, method 1300 may determine the current source degree for the ghost channel. Method 1300 may then proceed to step 1305. At step 1305, method 1300 may determine whether the ghost channel source degree returned from the selection routine is different from the current ghost channel source degree. If it is not, then method 1300 may proceed to step 1308, wherein method 1300 may proceed to the next ghost channel and repeat the method by returning to step 1302. If the ghost channel selection routine returns a different source than what is currently used, then method 1300 may proceed to step 1306. At step 1306, method 1300 may switch the source of the current ghost channel from the degree 200 currently being used to the degree 200 returned from the ghost channel selection routine in step 1302. After switching the ghost channel source, method 1300 may proceed to step 1308, wherein method 1300 may proceed to the next ghost channel and repeat the method by returning to step 1302.

Although FIG. 13 discloses a particular number of steps to be taken with respect to method 1300, method 1300 may be executed with more or fewer steps than those depicted in FIG. 13. In addition, although FIG. 13 discloses a certain order of steps comprising method 1300, the steps comprising method 1300 may be completed in any suitable order. For example, in the embodiment of method 1300 shown, the ghost channel selection routine is run for every ghost channel. However, in some configurations it may not be desirable or efficient to run the routine for every ghost channel continuously. It may be more efficient to, for instance, only run the routine for every other ghost channel the first time through method 1300, and run the routine for the other half of ghost channels the second time through method 1300.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A system for mitigating the effects of polarization hole burning in an optical communication system, comprising:
   an optical input signal including one or more traffic channel(s);
   a measurement module configured to check for the existence of ghost channels around the traffic channel(s);
   a ghost channel generation module configured to generate a ghost channel around the traffic channel(s) at least by amplifying a spontaneous emission of the optical input signal;
   a power monitor configured to measure at least a signal strength of the ghost channel and one of the traffic channels;
   a comparator configured to compare the signal strength of the ghost channel and the signal strength of the traffic channel; and
   an amplification module configured to amplify the signal strength of the ghost channel if the signal strength of the ghost channel is not substantially equal to the signal strength of the traffic channel.

2. The system of claim 1, wherein the ghost channel generation module is part of a wavelength selection switch within the optical communication system.

3. The system of claim 1, wherein the measurement module is part of a wavelength selection switch within the optical communication system.

4. The system of claim 1, wherein the measurement module is part of a wavelength selection switch within the optical communication system.

5. The system of claim 1, wherein the comparator is part of a wavelength selection switch within the optical communication system.

6. The system of claim 1, wherein the amplification module is part of a wavelength selection switch within the optical communication system.

7. The system of claim 1, wherein the amplification module is configured to limit amplification of the signal strength of the ghost channel so that it does not substantially exceed the signal strength of the optical input signal.

8. A method for mitigating the effects of polarization hole burning in an optical communication system, comprising:
- receiving an optical input signal at a first node of the optical communication system, the optical input signal including one or more traffic channel(s);
- checking for the existence of a ghost channel around the traffic channel(s);
- generating a ghost channel around the traffic channel(s) at least by amplifying a spontaneous emission of the optical input signal;
- forwarding the traffic channel(s) and the ghost channel to a second node of the optical communication system;
- measuring at least a signal strength of the traffic channel;
- measuring at least a signal strength of the ghost channel;
- determining if the signal strength of the ghost channel is substantially equal to the signal strength of the traffic channel; and
- amplifying the signal strength of the ghost channel if the signal strength of the ghost channel is not substantially equal to the signal strength of the traffic channel.

9. The method of claim 8, wherein generating a ghost channel around the traffic channel comprises generating one ghost channel on each side of the optical input signal.

10. The method of claim 8, wherein the ghost channel is within two channel separation wavelengths of the traffic channel.

11. The method of claim 8, further comprising determining the isolation level of the traffic channel.

12. The method of claim 11, wherein determining the isolation level of the traffic channel comprises determining whether immediately neighboring channels are traffic channels.

13. The method of claim 11, wherein determining the isolation level of the traffic channel comprises determining whether only one immediately neighboring channel is a traffic channel.

14. A method for mitigating the effects of polarization hole burning in an optical communication system, comprising:
- receiving an optical input signal at a first node of the optical communication system, the optical input signal comprising one or more traffic channel(s);
- forwarding the traffic channel(s) to a second node of the optical communication system;
- amplifying at least a spontaneous emission noise of the optical input signal to generate a ghost channel;
- forwarding the traffic channel(s) and the ghost channel to a third node of the optical communication system;
- comparing an optical strength of the ghost channel to an optical strength of the traffic channel(s);
- if the optical strength of the ghost channel is substantially equal to the optical strength of the traffic channel(s), capping amplification of the ghost channel; and
- if the optical strength of the ghost channel is not substantially equal to the optical strength of the traffic channel(s), amplifying the ghost channel.

* * * * *